US009444656B2

(12) United States Patent
Ding et al.

(10) Patent No.: US 9,444,656 B2
(45) Date of Patent: Sep. 13, 2016

(54) FLEXIBLE RECEIVER ARCHITECTURE

(75) Inventors: Weiqi Ding, Fremont, CA (US); Sergey Shumarayev, Los Altos Hills, CA (US); Peng Li, Palo Alto, CA (US); Sriram Narayan, Pleasanton, CA (US)

(73) Assignee: Altera Corporation, San Jose, CA (US)

( * ) Notice: Subject to any disclaimer, the term of this patent is extended or adjusted under 35 U.S.C. 154(b) by 590 days.

(21) Appl. No.: 13/289,791

(22) Filed: Nov. 4, 2011

(65) Prior Publication Data

US 2013/0114663 A1 May 9, 2013

(51) Int. Cl.
*H04L 25/03* (2006.01)

(52) U.S. Cl.
CPC ... *H04L 25/03038* (2013.01); *H04L 25/03146* (2013.01); *H04L 2025/03573* (2013.01)

(58) Field of Classification Search
CPC .............. H04L 2025/03573; H04L 25/03038; H04L 25/03146
USPC .................................................. 375/229–234
See application file for complete search history.

(56) References Cited

U.S. PATENT DOCUMENTS 5,541,956 A * 7/1996 Ueda ............................ 375/232
7,586,983 B1 9/2009 Shumarayev et al.
7,697,603 B1 4/2010 Wang et al.
8,274,326 B2 * 9/2012 Boecker ........................ 327/559
8,396,110 B1 * 3/2013 Hsieh ........................... 375/233
2003/0189998 A1 * 10/2003 Phanse et al. ................ 375/348
2003/0223489 A1 * 12/2003 Smee et al. .................... 375/233
2004/0233981 A1 * 11/2004 Porter et al. .................. 375/229
2007/0293163 A1 * 12/2007 Kilpatrick et al. ............. 455/84
2009/0316769 A1 * 12/2009 Hidaka et al. ................ 375/233
2012/0128053 A1 * 5/2012 Witt .............................. 375/232
2012/0201289 A1 * 8/2012 Abdalla et al. ............... 375/233
2012/0207204 A1 * 8/2012 Hidaka ......................... 375/233
2012/0235720 A1 * 9/2012 Jiang et al. ................... 327/158
2013/0136161 A1 * 5/2013 Mezer et al. ................. 375/219

OTHER PUBLICATIONS

Sameh et al., 2010 IEEE International Solid State Circuits Conference, pp. 170-172.*
Sam Palermo, ECEN689: Special Topics in High-Speed Links Circuits and Systems, Lecture 18: RX FIR and CTLE Equalization, Spring 2010.*
Sameh A Ibrahim and Behzad Razavi, SSCC 2010 / Session 8 / High-Speed Wireline Transceivers 18.8, pp. 170-172, 2010 IEEE International Solid-State Circuits Conference, Feb. 2010.
Mehrdad Ramezani , et al. "ISSCC 2011 / Session 20 / High-Speed Transceivers & Building Blocks / 20.4", Feb. 23, 2014, pp. 352-354, IEEE XP032013769.
Extended European Search Report for Application No. 12188984. 4-1860, Aug. 29, 2014, 6 sheets.

* cited by examiner

*Primary Examiner* — Freshteh N Aghdam
(74) *Attorney, Agent, or Firm* — Okamoto & Benedicto LLP

(57) ABSTRACT

One embodiment relates to a receiver circuit for a data link. The receiver circuit includes at least a first signal path, a second signal path, and a path selector circuit. The first signal path includes first equalization circuitry, and the second signal path includes second equalization circuitry. The path selector circuit is configured to select one signal path of the first and second signal paths. Other embodiments and features are also disclosed.

17 Claims, 8 Drawing Sheets

CTLE 300

FIG. 4 Variable CTLE 400

210

FLEXIBLE RECEIVER ARCHITECTURE

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed links. Examples of industry-standard protocols for serial interfaces include PCI Express® (Peripheral Component Interconnect Express), XAUI (X Attachment Unit Interface), sRIO (serial Rapid IO), and others.

As the operating speed of the high-speed data links increases to rates which are tens of gigabits per second (Gbps), sophisticated equalization schemes become more necessary to compensate for high-frequency signal loss. Unfortunately, while equalization circuitry may be designed to implement a complex equalization technique, such circuitry typically consumes a large amount of power and is generally inflexible in terms of meeting the requirements of various different types of applications.

SUMMARY

One embodiment relates to a receiver circuit for a data link. The receiver circuit includes at least a first signal path, a second signal path, and a path selector circuit. The first signal path includes first equalization circuitry, and the second signal path includes second equalization circuitry. The path selector circuit is configured to select one signal path of the first and second signal paths.

Another embodiment relates to an integrated circuit which includes at least a serial data receiver and a path selector circuit. The serial data circuit includes multiple signal paths, and each signal path includes at least one equalization circuit. The path selector circuit is configured to select one signal path of the multiple signal paths.

Another embodiment relates to a method of receiver equalization. An integrated circuit is configured to use a selected signal path of multiple signal paths for receiver equalization. Equalization may be performed on received data using the selected signal path while shutting off power to non-selected signal paths.

Other embodiments and features are also disclosed.

DETAILED DESCRIPTION

The present disclosure provides an innovative receiver architecture that overcomes the above-discussed problems. The receiver architecture enables the flexible use of equalization circuitry which may be flexibly used with different types of applications.

Figure 1:
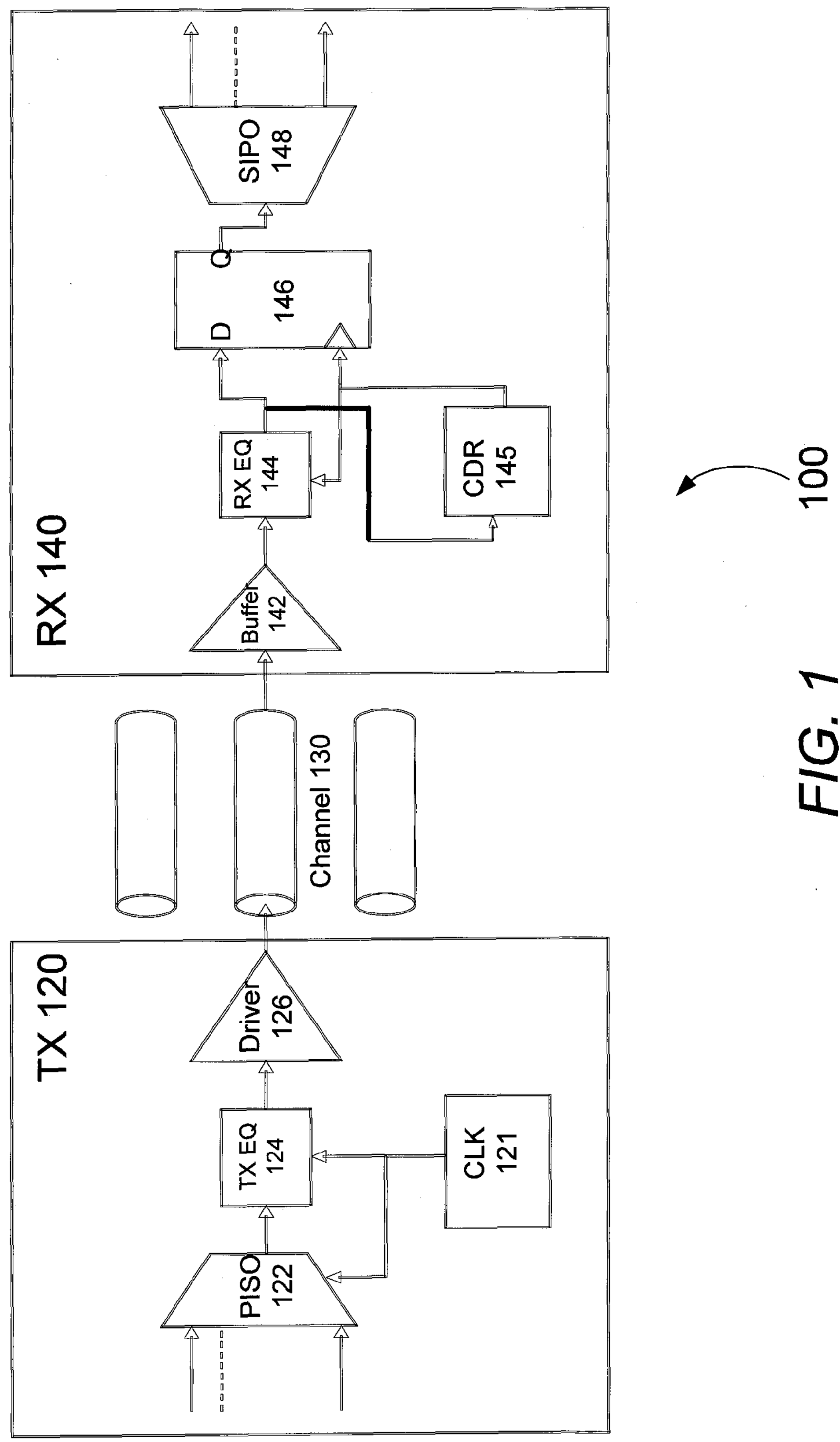
FIG. 1 is a high-level diagram of a communication link in accordance with an embodiment of the invention.

FIG. 1 is a high-level diagram of a communication link in accordance with an embodiment of the invention. As shown in FIG. 1, a communication link is generally composed of a transmitter (TX) 120, a receiver (RX) 140, and a communication channel (CH) 130 that is located in between the transmitter and the receiver.

The TX 120 may include a parallel-in-serial-out (PISO) circuit 122. The PISO (serializer) circuit 122 is configured to receive parallel data signals and convert it to a serial data signal. For example, the transmitter 120 may be part of an integrated circuit, and the parallel data signals may be provided by a communication protocol module in the integrated circuit.

The serial data signal may be adjusted by a transmitter equalizer (TX EQ) circuit 124. In one embodiment, the TX EQ circuit 124 may implement a finite impulse response (FIR) equalization that pre-distorts the transmitted signal to compensate for signal distortion in the channel 130. Clock generator (CLK) circuit 121 may utilize a phase locked loop circuit to provide a clock signal to the PISO 122 and TX EQ 124 circuits. The output from the TX EQ 124 circuit may be provided to a driver circuit 126. The driver circuit 126 may be configured to transmit the serial data signal over the channel 130.

The channel 130 communicates the serial data signal from the transmitter 120 to the receiver 140. The channel 130 may use multiple lanes to communicate the serial data signal.

The receiver 140 may be configured to receive the transmitted serial data signal from the multiple-lane channel into buffer circuitry 142. The buffer circuitry 142 may output the received serial data signal to receiver equalization (RX EQ) circuit 144. The RX EQ circuit 144 may be configured to perform one or more equalizations, as described further herein, to compensate for high-frequency signal loss in the channel. The RX EQ circuit 144 may output an "equalized" serial data signal to both a clock data recovery (CDR) circuit 145 and to a data input of a latch circuit 146.

The CDR circuit 145 may use a PLL to recover the clock signal from the serial data signal. The recovered clock signal may be provided to clock inputs of the RX EQ circuit 144 and to a latch circuit 146.

The latch circuit 146 may be configured to receive the "equalized" serial data signal from the RX EQ circuit 144 at its data input and to receive the recovered clock signal from the CDR circuit 145 at its clock input. The latch circuit 146 outputs the regenerated serial data signal to a serial-in-parallel-out (SIPO) circuit 148. The SIPO (deserializer) circuit 148 is configured to receive a serial data signal and convert it to parallel data signals. The parallel data signals may be provided to other circuitry of the receiving device. For example, the receiving device may be an integrated circuit, and the parallel data signals may be provided to a communication protocol module in the integrated circuit.

Figure 2:
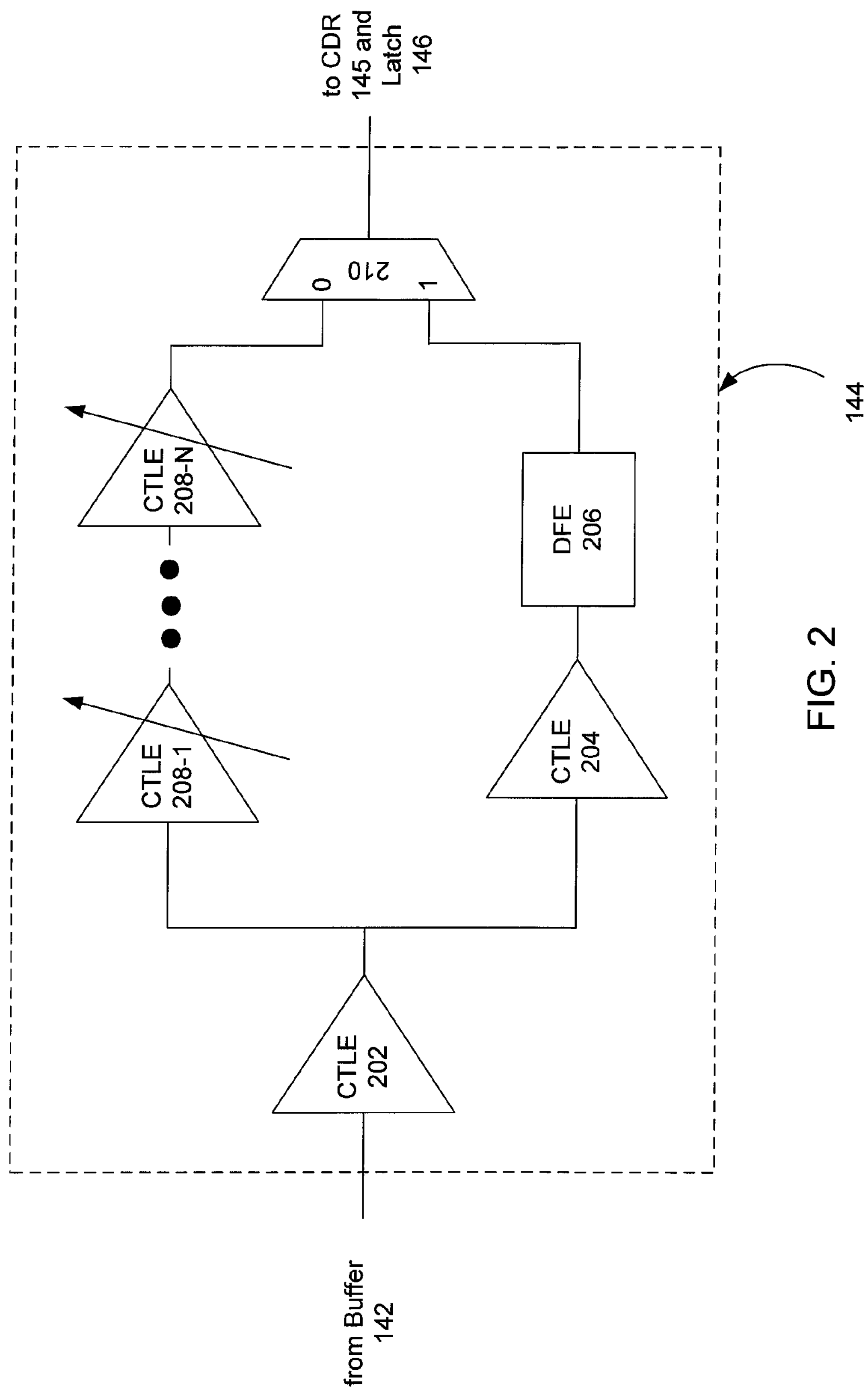
FIG. 2 depicts a receiver equalizer circuit in accordance with an embodiment of the invention.

FIG. 2 depicts a receiver equalizer (RX EQ) circuit 144 in accordance with an embodiment of the invention. As shown, the RX EQ circuit 144 receives a serial data signal from the RX buffer circuit 142, and, after applying equalization to the serial data signal, outputs the "equalized" serial data signal to the CDR circuit 145 and the latch circuit 146.

The serial data signal from the RX buffer circuit 142 is received by a first continuous-time linear estimation (CTLE) circuit 202. The first CTLE circuit 202 applies an initial, generally linear, compensation to the signal. One embodiment of the first CTLE circuit 202 is described below in relation to FIG. 3. The first CTLE circuit 202 may provide its output signal to two signal paths.

A first signal path is shown on the bottom in the figure and may lead to a second CTLE circuit 204. The second CTLE circuit 204 applies a further, generally linear, compensation to the signal. In one embodiment, the second CTLE circuit 204 may also be implemented as described below in relation to FIG. 3. The second CTLE circuit 204 may provide its output signal to a decision feedback equalizer (DFE) circuit 206. The DFE circuit 206 is a non-linear equalization circuit which uses feedback relating to the logic state of previously-transmitted data bits in order to decide the logic state of a present data bit. Various embodiments of a DFE circuit 206 may be utilized. For example, in one embodiment, the DFE circuit 206 may be implemented as described in U.S. Pat. No. 7,697,603, issued Apr. 13, 2010 to Wang et al., the disclosure of which is hereby incorporated by reference in its entirety. In another embodiment, the DFE circuit 206 may be implemented in a similar way as disclosed in "A 20 Gb/s 40 mW Equalizer in 90 nm CMOS Technology," by Sameh A. Ibrahim and Behzad Razavi, Digest of Technical Papers, IEEE International Solid-State Circuits Conference (ISSCC), February 2010, pp. 170-171. In other embodiments, the DFE circuit 206 may be implemented with other conventional designs.

The second signal path is shown on the top in the figure and may include one or more analog equalizer circuits in series. As depicted in FIG. 2, the second signal path includes a series of N CTLE circuits (208-1 through 208-N), where N is at least one. In one embodiment, each CTLE circuit 208-*n* may be a variable CTLE circuit. One embodiment of a variable CTLE circuit is described below in relation to FIG. 4. Other embodiments may also include variable CTLE circuits and non-variable CTLE circuits (for example, as shown in FIG. 3) in the series.

The output of the DFE circuit 206 of the first signal path may be provided to a first input (1) of a path selector circuit 210, and the output of the last CTLE circuit 208-N of the second signal path may be provided to a second input (0) of the path selector circuit 210. The path selector circuit 210 may be configured to select the "equalized" serial data signal from either the first input or the second input. One embodiment of the path selector circuit 210 is described below in relation to FIG. 5.

Figure 3:
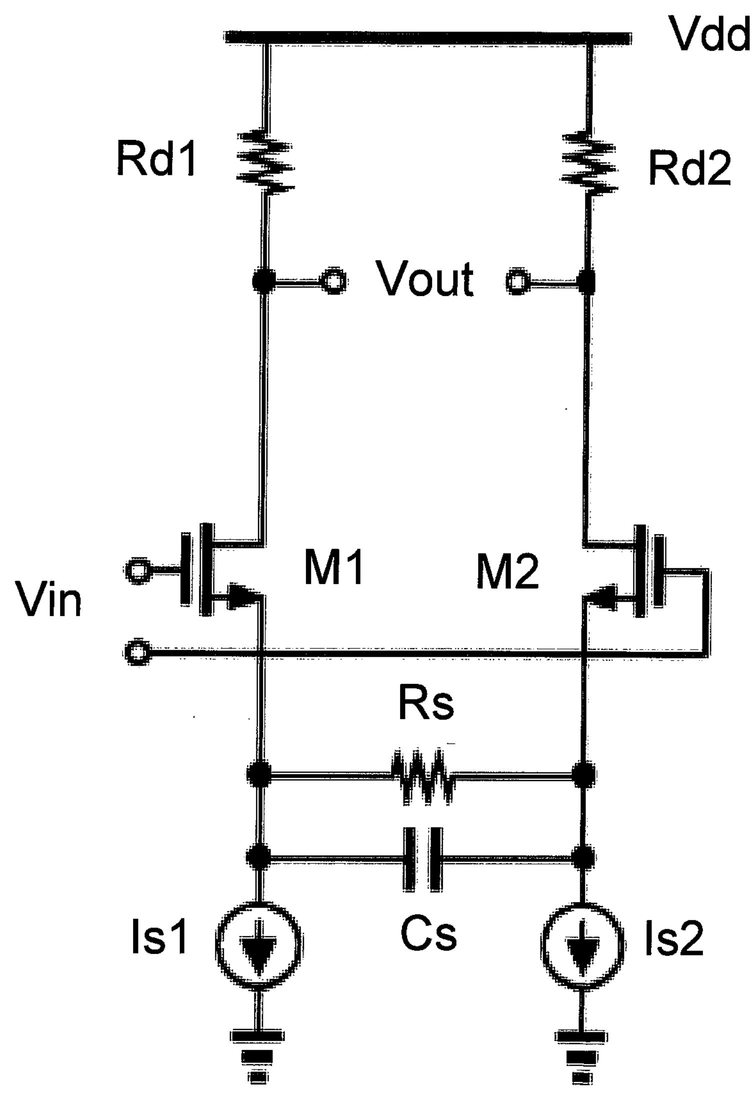
FIG. 3 depicts a continuous-time linear estimation (CTLE) circuit in accordance with an embodiment of the invention.

FIG. 3 depicts a CTLE circuit 300 in accordance with an embodiment of the invention. As depicted, the CTLE circuit 300 may include two drain resistors Rd1 and Rd2, transistors M1 and M2, source resistor Rs, source capacitor Cs, and two source current sinks Is1 and Is2. The drain resistor Rd1 may be connected between the drain of transistor M1 and voltage source Vdd, and the drain resistor Rd2 may be connected between the drain of transistor M2 and voltage source Vdd. The current sink Is1 may be connected between the source of transistor M1 and ground, and the current sink Is2 may be connected between the source of transistor M2 and ground.

The differential input signal Vin is provided to the gates of the transistors M1 and M2, and the differential output signal Vout is generated at two output nodes, where a first output node is between the drain of transistor M1 and drain resistor Rd1, and a second output node is between the drain of transistor M2 and the drain resistor Rd2. The source capacitor Cs and the source resistor Rs may be connected in a parallel manner between the sources of the two transistors M1 and M2. The source capacitor Cs functions as a peaking capacitor that may be used to adjust the amount of gain produced at the resonant frequency. The source resistor Rs functions as a source degeneration resistor that may be used to adjust a low-frequency gain of the CTLE circuit 300.

Figure 4:
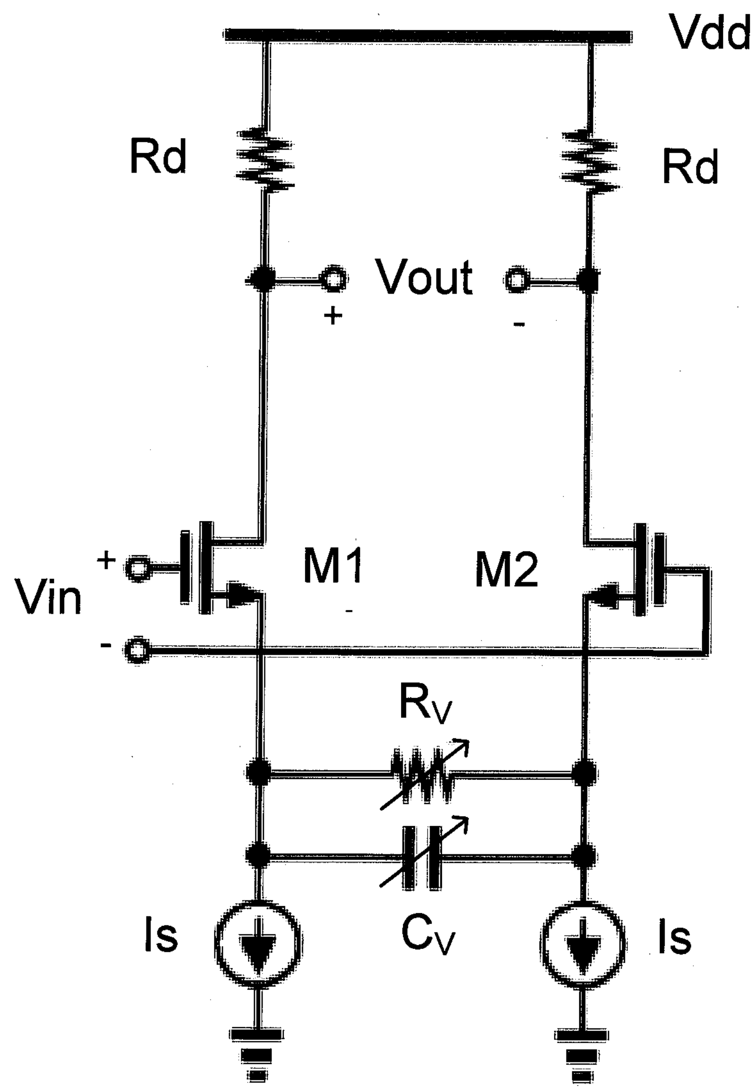
FIG. 4 depicts a variable CTLE circuit in accordance with an embodiment of the invention.

FIG. 4 depicts a variable CTLE circuit 400 in accordance with an embodiment of the invention. The variable CTLE circuit 400 of FIG. 4 is similar to the CTLE circuit 300*v* of FIG. 3. The differences are that, in the variable CTLE circuit 400, the source capacitor is a variable capacitor Cv, and the source resistor is a variable resistor Rv. The variable capacitor Cv and variable resistor Rv enable the adjustment of the frequency and gain characteristics of the circuit 400 for equalization purposes.

Figure 5:
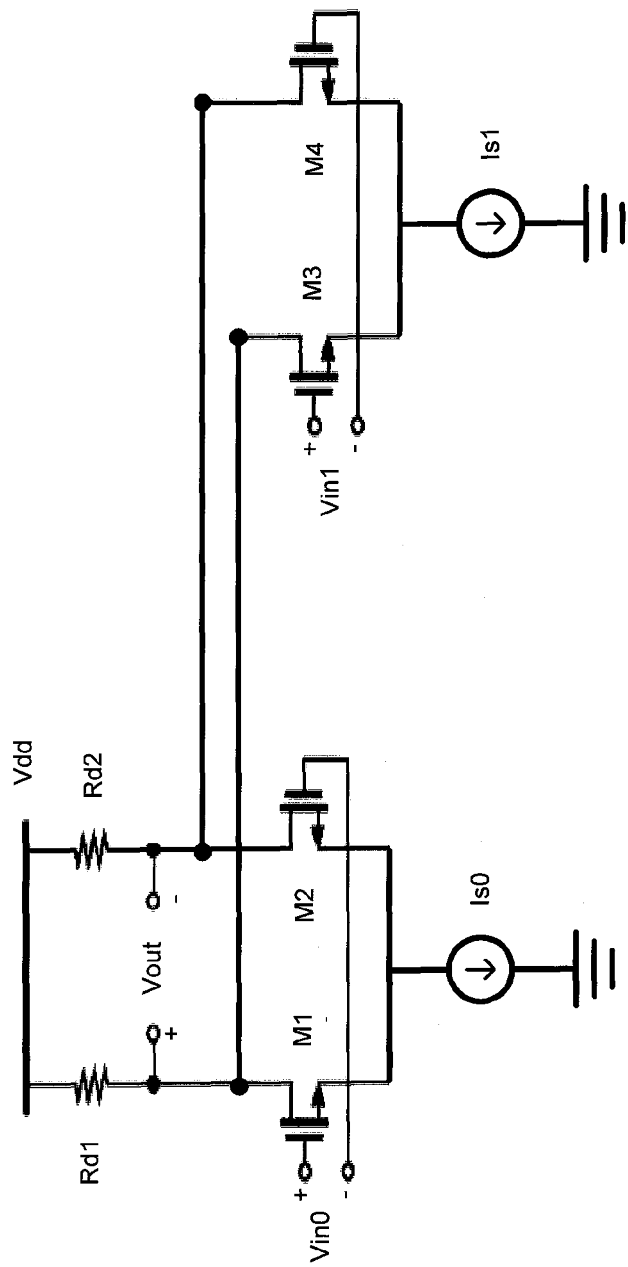
FIG. 5 depicts a path selector circuit in accordance with an embodiment of the invention.

FIG. 5 depicts a path selector circuit 210 in accordance with an embodiment of the invention. As depicted, the path selector circuit 210 may include two resistors Rd1 and Rd2, a first pair of transistors M1 and M2, a second pair of transistors M3 and M4, and two current sinks Is0 and Is1. The resistor Rd1 may be connected between the voltage source Vdd and the drain of transistor M1 and also between the voltage source Vdd and the drain of transistor M3. The resistor Rd2 may be connected between the voltage source Vdd and the drain of transistor M2 and also between the voltage source Vdd and the drain of transistor M4. The current sink Is0 may be connected between the source of transistor M1 and ground and also between the source of transistor M2 and ground. The current sink Is1 may be connected between the source of transistor M3 and ground and also between the source of transistor M4 and ground.

A first differential input signal Vin0 may be provided to the gates of the first pair of transistors M1 and M2, and a second differential input signal Vin1 may be provided to the gates of the second pair of transistors M3 and M4. The differential output signal Vout is generated at two output nodes. A first output node is between the resistor Rd1 and the drain of transistor M1 and also between the resistor Rd1 and the drain of transistor M3. A second output node is between the resistor Rd2 and the drain of transistor M2 and also between the resistor Rd2 and the drain of transistor M4.

To select the first differential input signal Vin0 to drive the output signal Vout, the first current sink Is0 is turned on, while the second current sink Is1 is turned off. To select the second differential input signal Vin1 to drive the output signal Vout, the second current sink Is1 is turned on, while the first current sink Is0 is turned off.

Figure 6:
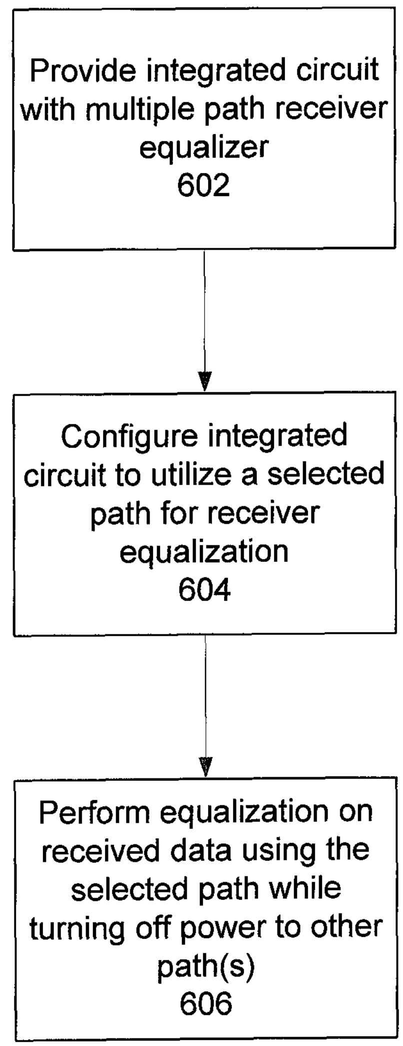
FIG. 6 is a flow chart of a method for receiving a serial data signal in accordance with an embodiment of the invention.

FIG. 6 is a flow chart of a method 600 for receiver equalization in accordance with an embodiment of the invention. An integrated circuit with a multiple-path receiver equalizer is provided 602. In one embodiment, the multiple path receiver may have two signal paths, as described above in relation to FIG. 2. The integrated circuit may then be configured (programmed) 604 to utilize a selected signal path for receiver equalization. Equalization may then be performed 606 on received data using the selected signal path while turning off power to the non-selected signal path(s).

Referring to the equalization circuitry 200 described above in relation to FIG. 2, selection of the first path on the bottom of FIG. 2 (with CTLE 204 and DFE 206) may be advantageous in certain applications due to the capabilities of the DFE circuit 206 to reduce inter-symbol interference (ISI) while being less sensitive to clock jitter. However, the DFE circuit 206 generally requires a relatively large amount of power to operate.

On the other hand, selection of the second path on the top of FIG. 2 (with the series of CTLE circuits 208-1 through 208-N) may be sufficient in certain applications and may advantageously consume less power than the first path. The consumption of less power is achieved by deactivating (turning off power to) the circuitry of the first path.

Thus, the present disclosure provides a flexible architecture for receiver equalization which may be advantageously configured depending on the link application. For example, to support longer-range applications, such as 25 to 28 Gbps backplane applications, the first path (including the DFE) may be selected.

On the other hand, to support shorter-range applications, such as 28 Gbps chip-to-chip applications, the second path (the series of CTLE) may be selected so as to conserve a substantial amount of power. In this case, the circuitry of the second path may be configured to support a wide-bandwidth with no AC boost.

The second path may also be selected to support lower-speed 10-16 Gbps applications. In this case, the circuitry of the second path may be configured to boost a signal amplitude at lower frequencies (i.e. provide an AC boost at the lower frequencies).

Figure 7:
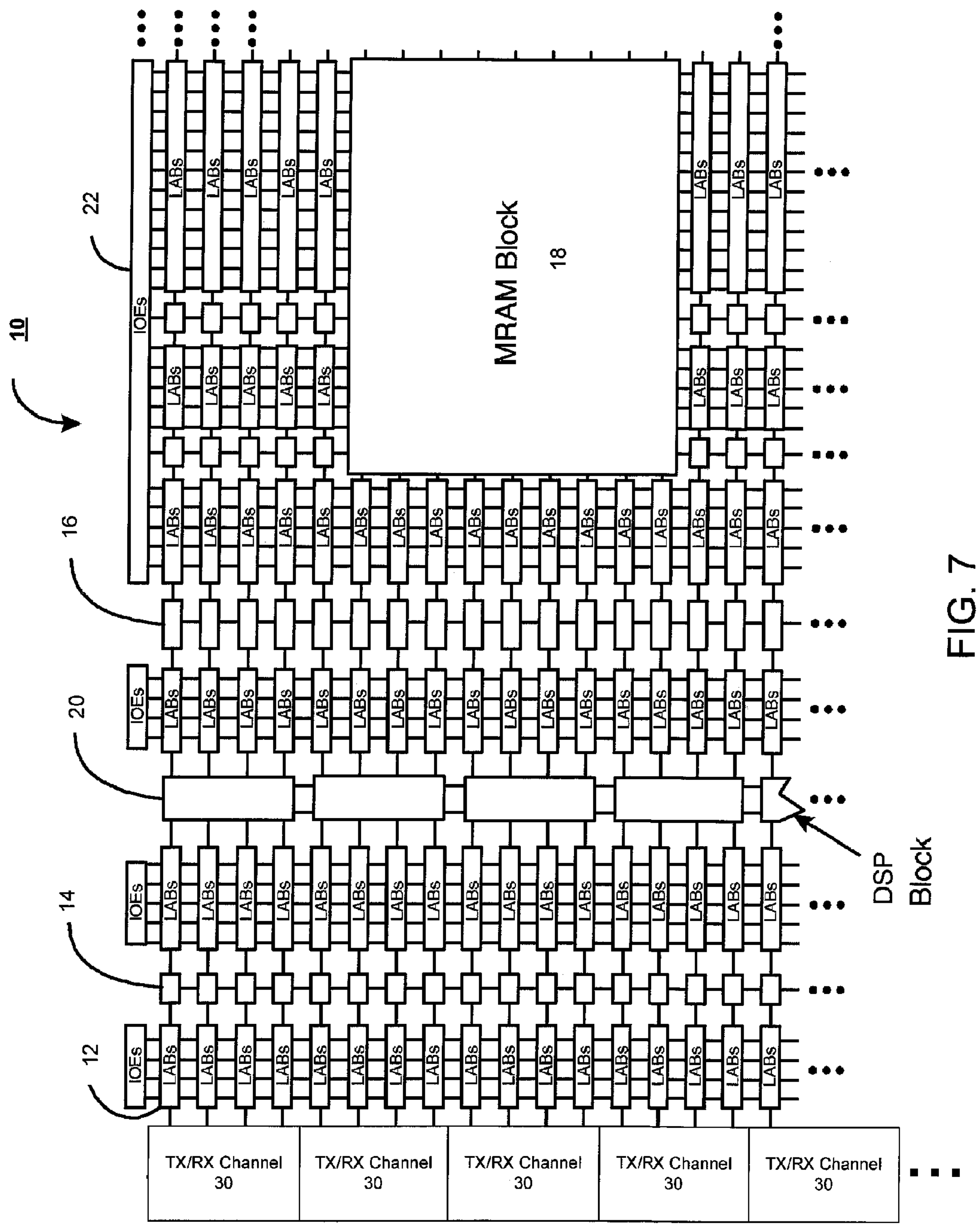
FIG. 7 is a simplified partial block diagram of a field programmable gate array (FPGA) that can include aspects of the present invention.

FIG. 7 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 8:
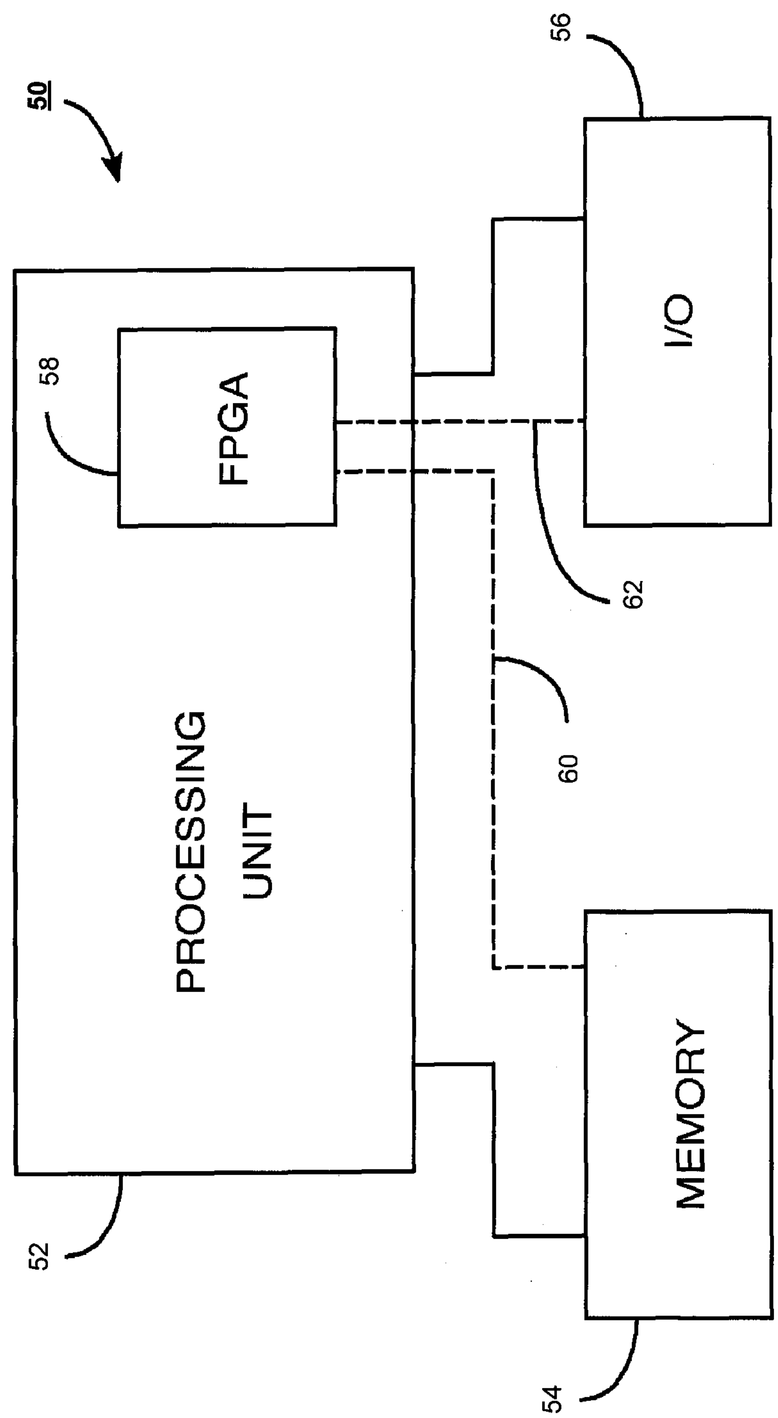
FIG. 8 is a block diagram of an exemplary digital system that can employ techniques of the present invention.

The present invention can also be implemented in a system that has a FPGA as one of several components. FIG. 8 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A receiver circuit for a data link, the receiver circuit comprising:

a first signal path including first equalization circuitry;

a second signal path including second equalization circuitry; and a path selector circuit which selects one signal path of the first and second signal paths and outputs an equalized signal from said one signal path;

a latch circuit which receives said equalized signal from said one signal path and outputs a regenerated serial data signal; and a serial-input parallel-output circuit which receives the regenerated serial data signal from the latch circuit, wherein the first signal path comprises a decision feedback equalizer circuit and the second signal path comprises linear equalization without decision feedback equalization.

2. The receiver circuit of claim 1, wherein the first signal path comprises a continuous-time linear estimation circuit in series with the decision feedback equalizer circuit.

3. The receiver circuit of claim 1, wherein the second signal path comprises at least one analog equalizer circuit.

4. The receiver circuit of claim 3, wherein the second signal path comprises a plurality of variable continuous-time linear estimation circuits in series.

5. The receiver circuit of claim 4, wherein each variable continuous-time linear estimation circuit in said series boosts a signal amplitude for a range of frequencies.

6. The receiver circuit of claim 3, wherein the second signal path comprises a series of continuous-time linear estimation circuits, including at least one variable continuous-time linear estimation circuit, wherein the variable continuous-time linear estimation circuit comprises a first node between a first transistor and a first current source, a second node between a second transistor and a second current source, and a resistor and a capacitor in parallel between the first and second nodes, wherein at least one of the resistor and the capacitor is variable.

7. The receiver circuit of claim 1, wherein the receiver circuit is configured to shut-off power to an un-selected signal path.

8. The receiver circuit of claim 1, further comprising:

a first analog equalizer circuit for receiving a data signal and for outputting the data signal to the first and second signal paths.

9. The receiver circuit of claim 8, further comprising:

a buffer circuit for providing the data signal to the first analog equalizer circuit; and a clock data recovery circuit for receiving an equalized data signal from the path selector circuit.

10. An integrated circuit comprising:

a serial data receiver including multiple signal paths, each signal path including at least one equalization circuit; and a path selector circuit which is configured to select one signal path of the multiple signal paths and outputs an equalized signal from said one signal path;

a latch circuit which receives said equalized signal from said one signal path and outputs a regenerated serial data signal; and a serial-input parallel-output circuit which receives the regenerated serial data signal from the latch circuit, wherein a first signal path of the multiple signal path comprises a decision feedback equalizer circuit, and a second signal path of the multiple signal path comprises linear equalization without decision feedback equalization.

11. The integrated circuit of claim 10, wherein the first signal path comprises a continuous-time linear estimation circuit in series with the decision feedback equalizer circuit.

12. The integrated circuit of claim 11, wherein the second signal path comprises a plurality of variable continuous-time linear estimation circuits in series.

13. The integrated circuit of claim 10, wherein the serial data receiver is configured to shut-off power to an un-selected signal path.

14. The integrated circuit of claim 10, wherein the integrated circuit comprises a field programmable gate array.

15. A method of receiver equalization, the method comprising:

providing an integrated circuit with a multiple-path receiver equalizer and a path selector circuit;

performing electronic programming to configure the path selector circuit to use a selected signal path for receiver equalization; and performing equalization on received data using the selected signal path and outputting an equalized signal from the selected signal path;

latching said equalized signal and outputting a regenerated serial data signal; and converting the regenerated serial data signal to a parallel signal, wherein a first signal path of the multiple-path receiver comprises a decision feedback equalization circuit and a second signal path of the multiple-path receiver comprises linear equalization without decision feedback equalization.

16. The method of claim 15, further comprising:

shutting off power to the decision feedback equalization circuit if the first signal path is not selected.

17. The method of claim 15, wherein the second signal path comprises a variable continuous-time linear estimation circuit.

* * * * *